United States Patent Office 3,235,609
Patented Feb. 15, 1966

3,235,609
DEHYDROFLUORINATION OF FLUOROHYDROCARBONS
Maurice Stacye, Robert Stephens, and John Colin Tatlow, Birmingham, England, assignors to National Research Development Corporation, London, England, a British corporation
No Drawing. Filed Mar. 11, 1963, Ser. No. 264,021
Claims priority, application Great Britain, Mar. 16, 1962, 10,286/62
6 Claims. (Cl. 260—648)

This invention relates to the dehydrofluorination of fluorohydrocarbons.

Hitherto, fluorohydrocarbons, and particularly closed ring compounds, such as fluoro-butanes, -pentanes, -hexanes and -hexenes, have been dehydrofluorinated by treatment with aqueous potassium hydroxide. Pyrolytic dehydrofluorination has also been proposed, but this has the disadvantage that, at the temperatures usually necessary to promote reasonable yields of the dehydrofluorinated product, the closed ring compounds tend to decompose. The present invention is based upon the discovery of an alternative method of dehydrofluorinating closed ring fluorohydrocarbons which is particularly effective, which provides a synthetic route to compounds not obtainable by dehydrofluorination using aqueous potassium hydroxide and which can be carried out at temperatures substantially lower than are normally required for pyrolytic dehydrofluorination.

According to the present invention, therefore, there is provided a process for the dehydrofluorination of closed ring fluorohydrocarbons selected from fluorocyclo-butanes, -pentanes, -hexanes and -hexenes which comprises contacting the fluorohydrocarbon with a heated metal fluoride whereby the dehydrofluorination is promoted.

A convenient method of carrying out the process involves packing the metal fluoride in a tube and heating the tube whilst the fluorohydrocarbon is passed through it, preferably in a stream of inert gas such as nitrogen. The process is advantageously carried out under substantially anhydrous conditions.

The temperature to which the metal fluoride must be heated varies according to the fluorohydrocarbon treated, but it will normally be possible to obtain good yields at temperatures below 500° C. In many cases, a preferred working temperature will be in the range of 100° C. to 400° C., and particularly 300 to 400° C.

The metal fluoride is preferably a fluoride of a metal in Groups I, II or III of the Periodic Table. Alkali and alkaline earth metal fluorides especially sodium fluoride, are of particular importance, and aluminum fluoride is also envisaged as being of use.

Besides promoting dehydrofluorination, the heated metal fluoride is capable of causing isomerisation of the fluorohydrocarbon obtained as a result of the dehydrofluorination process, an effect which is not caused by aqueous potassium hydroxide and which is of the utmost importance e.g. in the conversion of certain fluorocyclo-hexanes and -hexenes to aromatic compounds. For instance, where a di-olefin containing vinylic hydrogen is a possible product of dehydrofluorination, as for example is the case in the dehydrofluorination of cis-3H/4H-octafluorocyclohexene, that product in the presence of heated metal fluoride will rearrange to a diene with allylic hydrogen and fluorine which immediately loses hydrogen fluoride to give a fluoro-aromatic compound. The process of the invention as applied to fluorocyclohexanes and -hexenes thus provides a new synthetic route to fluoro-aromatic compounds.

It will be understood that the dehydrofluorination of a diene with allylic hydrogen and fluorine as mentioned above proceeds spontaneously once the rearrangement from the vinylic form of the diene has occurred, as a diene with allylic hydrogen and fluorine is unstable. The presence of a metal fluoride is in no way necessary to promote this second dehydrofluorination, which proceeds so readily that it is not possible to determine whether or not the metal fluoride has an effect in promoting the dehydrofluorination.

The following examples illustrate the invention:

EXAMPLES

In these examples, reactions were carried out in horizontal tubes (preferably of metal though glass may be used if kept dry and at relatively low temperatures) heated electrically. The fluorohydrocarbons were introduced into the tube by slow evaporation in a stream of nitrogen.

Example 1

Undecafluorocyclohexane, $C_6F_{11}H$, B.P. 63° (9.0 g.), was passed over sodium fluoride pellets in a glass tube (temp. 320°, nitrogen flow-rate 3 l./hr.) to give decafluorocyclohexene $C_6F_{10}$ (6 g.) and unchanged undecafluorocyclohexane (2.7 g.).

Example 2

Trans-1H/2H-decafluorocyclohexane, $C_6F_{10}H_2$, B.P. 79° (6.7 g.), was passed over sodium fluoride pellets in a glass tube (temp. 320°, $N_2$ flow-rate 3 l./hr.) to give octafluorocyclohexa-1:4-diene (0.15 g.)\*, octafluorocyclohexa-1:3-diene (0.15 g.), 1H-nonafluorocyclohexene (2.25 g.), 3H-nonafluorocyclohexene (0.15 g.) and starting material (3.3 g.).

Example 3

Cis-1H/2H-decafluorocyclohexane, $C_6F_{10}H_2$, B.P. 91° (6.1 g.), was passed over sodium fluoride pellets in a glass tube (temp. 320°, $N_2$ flow-rate 3 l./hr.) to give octafluorocyclohexa-1:4-diene (0.15 g.)\*, octafluorocyclohexa-1:3-diene (0.15 g.), 1H-nonafluorocyclohexene (4.7 g.), 3H-nonafluorocyclohexene (0.3 g.) and starting material (0.3 g.).

Example 4

A mixture of trans-1H/3H- and trans-1H/4H-decafluorocyclohexanes, $C_6F_{10}H_2$, B.P. 78° (6.0 g.), was passed over sodium fluoride pellets in a glass tube (temp. 320°, $N_2$ flow-rate 3 l./hr.) to give octafluorocyclohexa-1:4-diene (0.27 g.), octafluorocyclohexa-1:3-diene (0.54 g.), 4H-nonafluorocyclohexene (2.43 g.), 3H-nonafluorocyclohexene (1.08 g.) and a starting material (0.81 g.).

Example 5

Cis-1H,3H/-decafluorocyclohexane, $C_6F_{10}H_2$, B.P. 89° (5.0 g.), was passed over sodium fluoride pellets in a glass tube (temp. 320°, $N_2$ flow-rate 3 l./hr.) to give octafluorocyclohexa-1:4-diene (0.4 g.), octafluorocyclohexa-1:3-diene (1.4 g.), 4H-nonafluorocyclohexene (1.0 g.) and 3H-nonafluorocyclohexene (0.8 g.).

Example 6

Cis-3H,4H/-octafluorocyclohexene, $C_6F_8H_2$, B.P. 116° (4.0 g.), was passed over sodium fluoride pellets in a glass tube (temp. 340°, $N_2$ flow-rate 3 l./hr.) to give 1H-heptafluorocyclohexa-1:4-diene (0.15 g.), 1H-heptafluorocyclohexa-1:3-diene (0.15 g.), 2H-heptafluorocyclohexa-1:3-diene (0.3 g.) mixed 1H,2H-octafluorocyclohexene (0.65 g.) and hexafluorobenzene (0.65 g.) pentafluorobenzene (1.0 g.) and 1H,6H-octafluorocyclohexene (0.35 g.).

Example 7

Trans-4H/5H-octafluorocyclohexene, $C_6F_8H_2$, B.P. 90° (4.9 g.), was passed over sodium fluoride pellets in a glass ---
\*By an isomerisation of the 1:3-diene.

tube (temp. 380°, $N_2$ flow-rate 3 l./hr.) to give 1H-heptafluorocyclohexa-1:4-diene (0.35 g.), 1H-heptafluorocyclohexa-1:3-diene (0.25 g.), 2H-heptafluorocyclohexa-1:3-diene (0.1 g.), mixed 1H,2H-octafluorocyclohexene (0.65 g.), hexafluorobenzene (0.75 g.) containing a trace of trans-3H/4H - octafluorocyclohexene, and pentafluorobenzene (0.6 g.) containing a trace of starting material.

Compounds produced in accordance with the invention are useful intermediates in organic fluorine chemistry.

We claim:

1. Process for the production of a polyfluorocycloalkene compound which comprises dehydrofluorinating a polyfluorohydrocarbon selected from the group consisting of polyfluorocyclobutanes, polyfluorocyclopentanes, polyfluorocyclohexanes and polyfluorocyclohexenes by bringing the latter into contact with sodium fluoride at a temperature between 100 and 500° C.

2. Process according to claim 1, in which the temperature is from 300° to 400° C.

3. Process according to claim 2 in which the reaction is conducted under anhydrous conditions.

4. Process according to claim 3, in which undecafluorocyclohexane is converted to decafluorocyclohexene.

5. Process according to claim 3, in which a decafluorocyclohexane is converted to a nonafluorocyclohexene.

6. Process according to claim 3, in which an octafluorocyclohexene is converted to a heptafluorocyclohexadiene.

References Cited by the Examiner

FOREIGN PATENTS 619,394   3/1949   Great Britain.

OTHER REFERENCES

Coe et al.: "Tetrahedron," vol. 9, pp. 240–5, 1960.

LEON ZITVER, *Primary Examiner.*

UNITED STATES PATENT OFFICE
CERTIFICATE OF CORRECTION

Patent No. 3,235,609                    February 15, 1966

Maurice Stacey et al.

It is hereby certified that error appears in the above numbered patent requiring correction and that the said Letters Patent should read as corrected below.

In the grant, line 1, and in the heading to the printed specification, line 4, for "Maurice Stacye", each occurrence, read -- Maurice Stacey --.

Signed and sealed this 31st day of January 1967.

(SEAL)
Attest:

ERNEST W. SWIDER                  EDWARD J. BRENNER
Attesting Officer                  Commissioner of Patents